US011027772B2

(12) United States Patent
Kawamura et al.

(10) Patent No.: US 11,027,772 B2
(45) Date of Patent: Jun. 8, 2021

(54) MOTOR CONTROLLER

(71) Applicant: JTEKT CORPORATION, Osaka (JP)

(72) Inventors: Hiroshi Kawamura, Okazaki (JP); Yuji Fujita, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/720,248

(22) Filed: Dec. 19, 2019

(65) Prior Publication Data

US 2020/0198695 A1 Jun. 25, 2020

(30) Foreign Application Priority Data

Dec. 21, 2018 (JP) .............................. JP2018-239458

(51) Int. Cl.
*H02K 17/32* (2006.01)
*B62D 5/04* (2006.01)

(52) U.S. Cl.
CPC ......... *B62D 5/0463* (2013.01); *B62D 5/0487* (2013.01); *B62D 5/0493* (2013.01)

(58) Field of Classification Search
CPC .. H02P 29/032; H02P 5/74; H02P 6/16; H02P 25/22; H02P 29/028; H02P 6/08; B62D 5/0463; B62D 5/0487; B62D 5/0493
See application file for complete search history.

(56) References Cited

U.S. PATENT DOCUMENTS

| 2002/0057070 | A1 | 5/2002 | Thomsen et al. |
| 2010/0171448 | A1* | 7/2010 | Kitanaka ................... H02P 5/74 318/45 |
| 2016/0006387 | A1 | 1/2016 | Nakamura et al. |
| 2019/0023315 | A1 | 1/2019 | Takizawa et al. |

FOREIGN PATENT DOCUMENTS

JP 2017-229156 A 12/2017

OTHER PUBLICATIONS

Aug. 31, 2020 Extended Search Report issued in European Patent Application No. 19218480.2.

* cited by examiner

*Primary Examiner* — Karen Masih
(74) *Attorney, Agent, or Firm* — Oliff PLC

(57) ABSTRACT

A motor controller is configured to control a motor including a plurality of winding groups. The motor controller includes a plurality of processors. Each of the processors is configured to independently control supply of driving electric power to each of the winding groups. When an abnormality occurs in which a torque to be generated in one of the winding groups is smaller than an individual rated torque and when a target overall torque is larger than a total of the individual rated torque for the winding group in which the abnormality does not occur, the processor, controlling supply of driving electric power to the winding group in which the abnormality does not occur, out of the plurality of processors controls supply of the driving electric power such that the winding group generate a torque larger than the individual rated torque.

5 Claims, 6 Drawing Sheets

MOTOR CONTROLLER

INCORPORATION BY REFERENCE

The disclosure of Japanese Patent Application No. 2018-239458 filed on Dec. 21, 2018 including the specification, drawings and abstract is incorporated herein by reference in its entirety.

BACKGROUND

1. Technical Field

The present disclosure relates to a motor controller.

2. Description of Related Art

As a vehicle steering system, there is an electric power steering system (EPS) configured to apply, to a steering mechanism, an assist torque for assisting a driver's steering operation by using a motor as a drive source. The EPS may use a motor including winding groups having a plurality of separate energization systems for the purpose of achieving redundancy or the like.

For example, Japanese Unexamined Patent Application Publication No. 2017-229156 (JP 2017-229156 A) discloses a motor controller configured to control this type of motor. The motor controller includes two microcomputers and two drive circuits corresponding to winding groups of two systems. The microcomputers control the corresponding drive circuits based on a steering torque input to a steering mechanism to independently control driving electric power to be supplied to the winding groups of two systems. Thus, the entire motor outputs, as an assist torque, the total of torques that are based on magnetic fluxes generated in the winding groups of the respective systems.

SUMMARY

In the motor controller described above, a rated torque is set as an upper limit of a torque that can be output in the winding group of each energization system. A target torque of each energization system is calculated by the microcomputer so that the target torque is equal to or smaller than the rated torque preset depending on, for example, specifications of the motor or the drive circuit. The rated torque is smaller than a limit torque determined depending on the structure of the motor as a limit of the torque that can be output in the winding group of each energization system. Further, the rated torque is set to such a torque that a temperature increase caused by energization can be permitted and a sufficient assist torque can continuously be applied when a necessary assist torque increases as in a case of stationary steering or the like.

In the configuration described above, in the event of an abnormality such as a wire disconnection or a short circuit in one energization system or a decrease in a power supply voltage of an on-board power supply, the torque generated in the winding group of the remaining energization system may result in an insufficient assist torque. There is room for further improvement.

This problem may arise not only in the EPS, but also in a steer-by-wire type steering system in which power transmission between a steering portion and a steered portion is separated. For example, the problem may arise not only in the case where the motor configured to apply the assist torque is controlled for the EPS, but also in a case where a motor configured to apply a steering operation torque for turning steered wheels is controlled for the steer-by-wire type steering system.

The present disclosure provides a motor controller in which deficiency of a torque to be applied from a motor can be suppressed in the event of an abnormality.

A motor controller according to one aspect of the present disclosure is configured to control a motor including a plurality of winding groups. The motor is provided with a plurality of energization systems. Each of the winding groups is included in a corresponding one of the energization systems. The motor controller includes a plurality of processors. Each of the processors is configured to independently control supply of driving electric power to each of the winding groups in the corresponding one of the energization systems. Each of the processors are configured to calculate respective control signals based on target individual torques which is split for each of the winding groups in the corresponding one of the energization systems from a target overall torque to be generated in the motor. Each of the processors include drive circuits configured to supply the driving electric power to each of the winding groups in the corresponding one of the energization systems based on the control signals. Each of the processors are configured to calculate the target individual torques so that each of the target individual torques is equal to or smaller than an individual rated torque set to be smaller than an individual limit torque determined depending on a structure of the motor as a limit of a torque to be output in each of the winding groups in the corresponding one of the energization systems. Each of the processors are configured such that, when an abnormality occurs in which a torque to be generated in one of the winding groups in the corresponding one of the energization systems is smaller than the individual rated torque and the target overall torque is larger than when a total of the individual rated torque for the winding group in the corresponding one of the energization systems in which the abnormality does not occur, the processor, controlling supply of driving electric power to the winding group in the corresponding one of the energization systems in which the abnormality does not occur, out of the plurality of processors controls supply of the driving electric power such that the winding group generate a torque larger than the individual rated torque.

For example, if the motor or the drive circuit may be overheated in a short time, the winding group of each energization system can generate a torque larger than the individual rated torque from the viewpoint of the structure of the motor. In the motor controller according to the one aspect of the present disclosure, when the abnormality occurs in which the torque to be generated in one of the winding groups in the corresponding one of the energization systems is smaller than the individual rated torque and when the target overall torque is larger than the individual rated torque for the winding group in the corresponding one of the energization systems in which the abnormality does not occur, the winding group of this energization system generates the torque larger than the individual rated torque. Therefore, deficiency of the torque to be applied from the motor can be suppressed for the short time until the motor or the drive circuit is overheated.

In the motor controller according to the one aspect of the present disclosure, each of the processors may be configured to detect a current abnormality including at least one of a wire disconnection and a short circuit in the energization system. The processors may be configured such that, when the current abnormality is detected and when the target overall torque is larger than the total of the individual rated torque for the winding group in the corresponding one of the energization systems in which the current abnormality does not occur, the processor, controlling supply of driving electric power to the winding group in the corresponding one of the energization system in which the current abnormality does not occur, out of the plurality of processors controls supply of the driving electric power such that the winding group generate a torque larger than the individual rated torque.

In the motor controller according to the one aspect of the present disclosure, the deficiency of the torque to be applied from the motor can be suppressed for the short time until the motor or the drive circuit is overheated in the event of the current abnormality in which the winding group of one of the energization systems cannot generate the torque due to, for example, a wire disconnection or a short circuit in this energization system.

In the motor controller according to the one aspect of the present disclosure, each of the processors may be configured to detect an operation abnormality of the processor configured to controls supply of driving electric power to the winding group in the corresponding one of the other energization system. The processors may be configured such that, when the operation abnormality is detected and when the target overall torque is larger than the total of the individual rated torque for the winding group in the corresponding one of the energization systems in which the operation abnormality does not occur, the processor, controlling supply of driving electric power to the winding group in the corresponding one of the energization systems in which the operation abnormality does not occur, out of the plurality of processors controls supply of the driving electric power such that the winding group generate a torque larger than the individual rated torque.

In the motor controller according to the one aspect of the present disclosure, the deficiency of the torque to be applied from the motor can be suppressed for the short time until the motor or the drive circuit is overheated in the event of the operation abnormality in which the winding group corresponding to one of processors cannot generate the torque due to, for example, a halt of the processor.

In the motor controller according to the one aspect of the present disclosure, the processors may be connected to individual external power supplies. The processors may be configured to calculate individual restriction torques for restricting the target individual torques to the individual rated torques or smaller based on power supply voltages of the external power supplies. The processors may be configured such that, when one of the winding groups in the corresponding one of the energization systems is in a restricted state in which the individual restriction torque is smaller than the individual rated torque and when the target overall torque is larger than a total of the individual rated torque of the winding group in the corresponding one of the energization systems that is not in the restricted state and the individual restriction torque of the energization system that is in the restricted state, the processor controlling supply of driving electric power to the winding group in the corresponding one of the energization systems that is not in the restricted state, out of the plurality of processors controls supply of the driving electric power such that the winding group generates a torque larger than the individual rated torque.

In the motor controller according to the one aspect of the present disclosure, the deficiency of the torque to be applied from the motor can be suppressed for the short time until the motor or the drive circuit is overheated in the restricted state in which the power supply voltage of one of the external power supplies decreases and the winding group of the energization system connected to the external power supply can only generate a torque smaller than the individual rated torque.

In the motor controller according to the one aspect of the present disclosure, the motor may be configured to generate a torque to be applied to a steering mechanism. In the motor controller according to the one aspect of the present disclosure, the deficiency of the torque to be applied from the motor is suppressed even if the abnormality occurs, for example, while the vehicle is making a turn. Accordingly, it is possible to reduce, for example, the occurrence of a case where the traveling direction of the vehicle deviates from a target direction.

In the motor controller according to the one aspect of the present disclosure, deficiency of the torque to be applied from the motor can be suppressed in the event of an abnormality.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

A first embodiment in which a motor controller is applied to a steering controller is described below with reference to the drawings.

Figure 1:
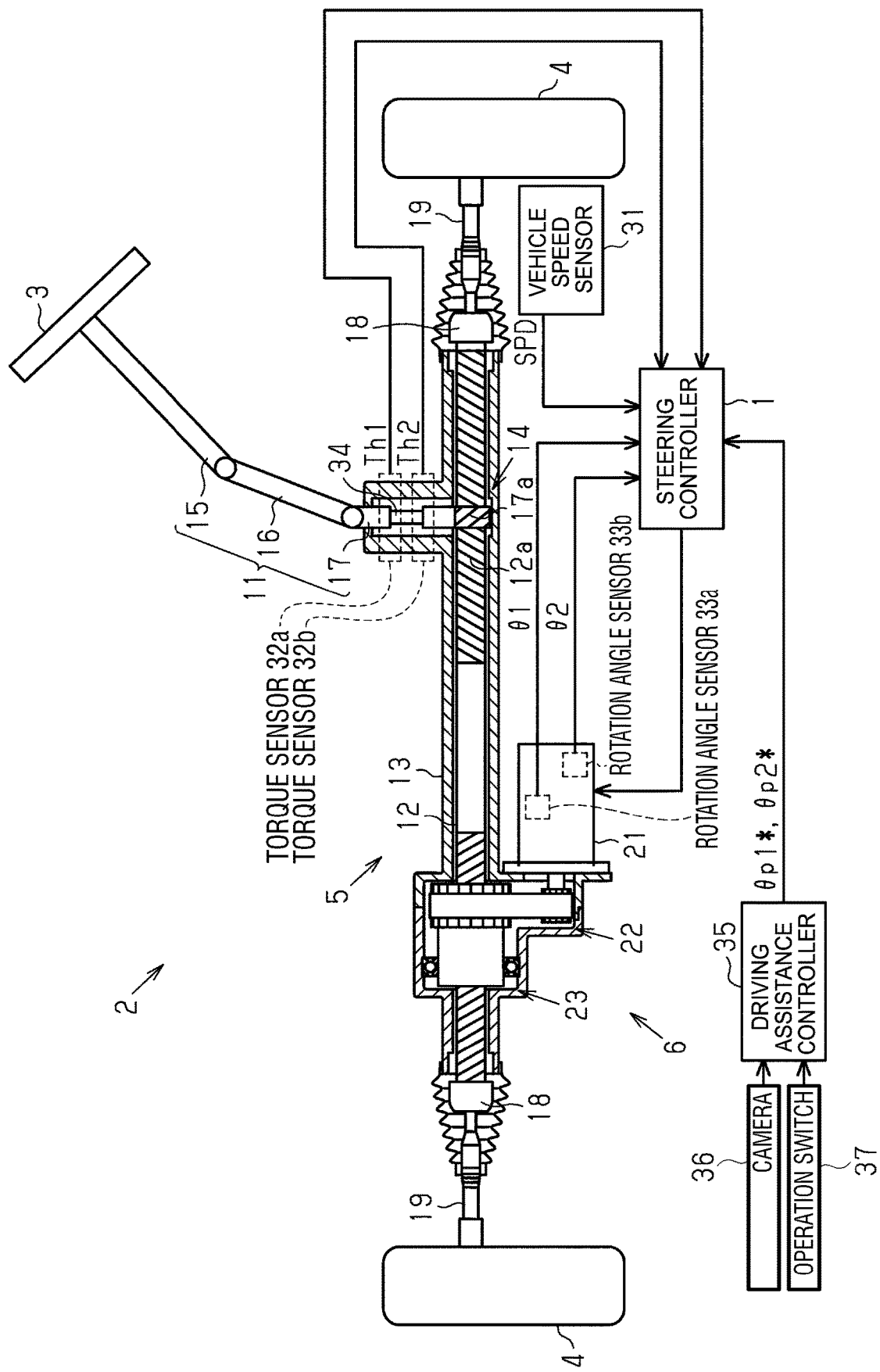
FIG. 1 is a schematic configuration diagram of an electric power steering system.

As illustrated in FIG. 1, a steering controller 1 controls a steering apparatus 2. The steering apparatus 2 is constructed as an electric power steering system (EPS). The steering apparatus 2 includes a steering mechanism 5 and an actuator 6. The steering mechanism 5 turns steered wheels 4 based on a driver's operation for a steering wheel 3. The actuator 6 applies a motor torque to the steering mechanism 5 as an assist torque (assist force) for assisting a steering operation or a steering operation torque (steering operation force) for turning the steered wheels 4.

The steering mechanism 5 includes a steering shaft 11, a rack shaft 12, a cylindrical rack housing 13, and a rack and pinion mechanism 14. The steering wheel 3 is fixed to the steering shaft 11. The rack shaft 12 serves as a steering operation shaft coupled to the steering shaft 11. The rack shaft 12 is inserted through the rack housing 13 in a reciprocable manner. The rack and pinion mechanism 14 converts rotation of the steering shaft 11 into reciprocating motion of the rack shaft 12. The steering shaft 11 is constructed by coupling a column shaft 15, an intermediate shaft 16, and a pinion shaft 17 in order from a side where the steering wheel 3 is located.

The rack shaft 12 and the pinion shaft 17 are arranged in the rack housing 13 at a predetermined crossing angle. The rack and pinion mechanism 14 is constructed such that rack teeth 12a formed on the rack shaft 12 mesh with pinion teeth 17a formed on the pinion shaft 17. Tie rods 19 are pivotably coupled to respective ends of the rack shaft 12 via rack ends 18 formed of ball joints provided at axial ends of the rack shaft 12. The distal ends of the tie rods 19 are coupled to knuckles (not illustrated) to which the steered wheels 4 are attached. In the steering apparatus 2, rotation of the steering shaft 11 along with the steering operation is converted into axial movement of the rack shaft 12 by the rack and pinion mechanism 14. The axial movement is transmitted to the knuckles via the tie rods 19. Thus, the steered angle of each of the steered wheels 4, that is, the traveling direction of a vehicle is changed.

The actuator 6 includes a motor 21, a transmission mechanism 22, and a conversion mechanism 23. The motor 21 is a drive source. The transmission mechanism 22 transmits rotation of the motor 21. The conversion mechanism 23 converts the rotation transmitted via the transmission mechanism 22 into reciprocating motion of the rack shaft 12. The actuator 6 transmits the rotation of the motor 21 to the conversion mechanism 23 via the transmission mechanism 22, and converts the rotation into the reciprocating motion of the rack shaft 12 by the conversion mechanism 23, thereby applying an assist torque or a steering operation torque to the steering mechanism 5. For example, a three-phase brushless motor is employed as the motor 21 of this embodiment. For example, a belt mechanism is employed as the transmission mechanism 22. For example, a ball screw mechanism is employed as the conversion mechanism 23.

The steering controller 1 acquires detection results from various sensors provided on the vehicle as pieces of information (condition amounts) indicating a driver's request, a traveling condition, and a steering condition, and controls the motor 21 based on the condition amounts. Examples of various sensors include a vehicle speed sensor 31, torque sensors 32a and 32b, and rotation angle sensors 33a and 33b. The vehicle speed sensor 31 detects a vehicle speed SPD. The torque sensors 32a and 32b are provided on the pinion shaft 17, and detect steering torques Th1 and Th2 input to the steering mechanism 5 based on a twist of a torsion bar 34, respectively. The steering torques Th1 and Th2 basically take the same value when the torque sensors 32a and 32b are normal. The rotation angle sensors 33a and 33b detect rotation angles θ1 and θ2 of the motor 21 as relative angles within a range of 360°, respectively. The rotation angles θ1 and θ2 basically take the same value when the rotation angle sensors 33a and 33b are normal.

The steering controller 1 is connected to a driving assistance controller 35 provided outside the steering controller 1. For example, the driving assistance controller 35 of this embodiment executes, as driving assistance control, lane keeping assistance control for assisting the driver's steering operation so that the vehicle easily travels while keeping a traveling lane. During execution of the lane keeping assistance control, the driving assistance controller 35 calculates, based on data on an image captured by a camera 36, an ideal steered angle at which the vehicle can keep traveling along the lane, and calculates driving assistance command values θp1* and θp2* based on a deviation between the ideal steered angle and an actual steered angle of each of the steered wheels 4. Each of the driving assistance command values θp1* and θp2* of this embodiment is a value indicating a target value of a rotation angle of the pinion shaft 17 (pinion angle θp). The pinion angle θp is convertible into the steered angle. The driving assistance controller 35 is connected to an operation switch 37 provided, for example, near a driver's seat of the vehicle and to be used for executing the driving assistance control. The driving assistance controller 35 executes the driving assistance control depending on whether the operation switch 37 is ON or OFF. During execution of the driving assistance control, the driving assistance controller 35 outputs the driving assistance command values θp1* and θp2* to the steering controller 1.

The steering controller 1 supplies driving electric power to the motor 21 based on signals indicating the condition amounts input from the sensors and signals input from the driving assistance controller 35, thereby controlling actuation of the actuator 6, that is, the torque to be applied to the steering mechanism 5 so that the rack shaft 12 reciprocates.

Figure 2:
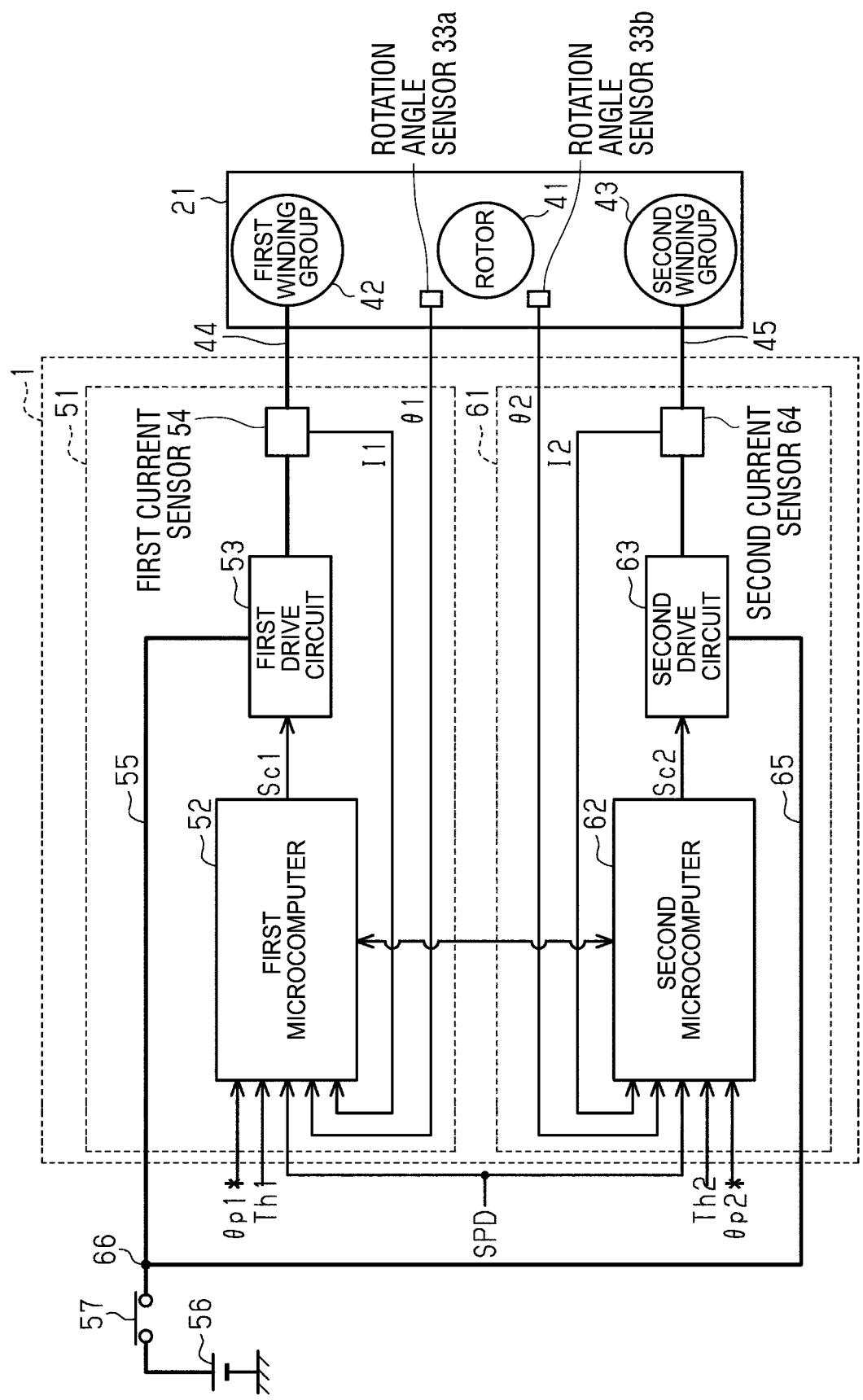
FIG. 2 is a block diagram of a steering controller of a first embodiment.

Next, the configuration of the motor 21 is described. As illustrated in FIG. 2, the motor 21 includes a rotor 41, and a first winding group 42 and a second winding group 43 wound around a stator (not illustrated). Each of the first winding group 42 and the second winding group 43 includes coils of three phases that are U, V, and W phases. The first winding group 42 and the second winding group 43 have separate energization systems. The first winding group 42 is connected to the steering controller 1 via first connection lines 44. The second winding group 43 is connected to the steering controller 1 via second connection lines 45. For convenience of the description, FIG. 2 illustrates one collective first connection line 44 and one collective second connection line 45 for the respective phases.

Figure 3A:
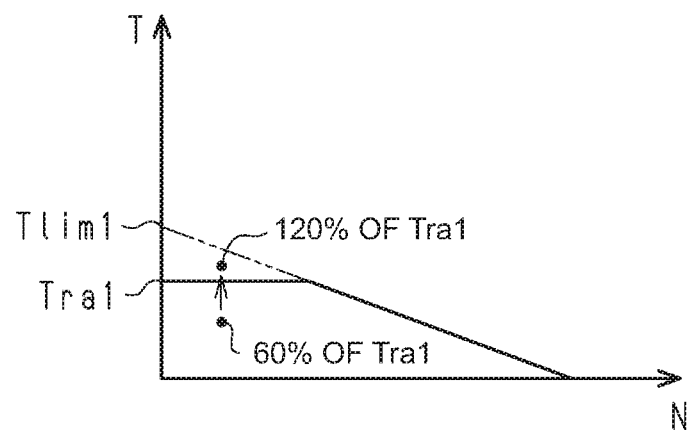
FIG. 3A is a graph illustrating N-T characteristics of a motor when a first winding group is energized.
Figure 3B:
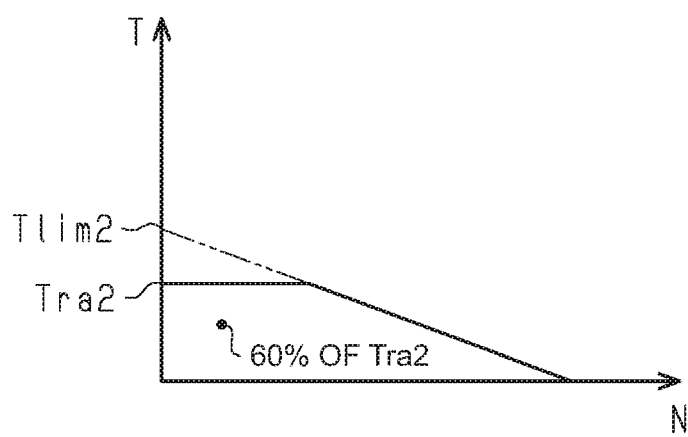
FIG. 3B is a graph illustrating N-T characteristics of the motor when a second winding group is energized.
Figure 3C:
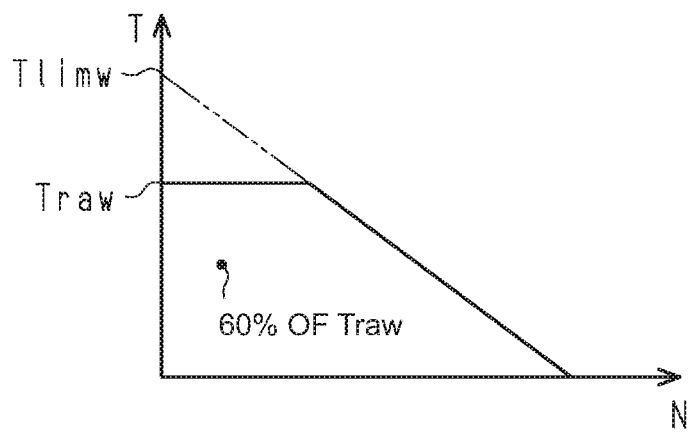
FIG. 3C is a graph illustrating N-T characteristics of the entire motor.

The first winding group 42 and the second winding group 43 of this embodiment are constructed to have the same specifications of the coils (wire diameters and numbers of turns of the winding). As illustrated in FIG. 3A and FIG. 3B, a first limit torque Tlim1 is equal to a second limit torque Tlim2. The first limit torque Tlim1 is an individual limit torque determined depending on a magnetic flux generated in the first winding group 42 and the structure of the motor 21 as typified by a magnetic flux density of the rotor 41 and a magnetic permeability of the stator. The second limit torque Tlim2 is an individual limit torque determined depending on a magnetic flux generated in the second winding group 43 and the structure of the motor 21. As illustrated in FIG. 3C, an overall limit torque Tlimw of the entire motor 21 is the total of the first limit torque Tlim1 and the second limit torque Tlim2.

An overall rated torque Traw is preset in the motor 21 as a smaller torque than the overall limit torque Tlimw and as such a torque that a temperature increase caused by energization can be permitted and a sufficient torque can continuously be applied when a necessary target overall torque Tw* increases as in a case of stationary steering or the like. Similarly, as illustrated in FIG. 3A and FIG. 3B, a first rated torque Tra1 is preset in the first winding group 42 as an individual rated torque smaller than the first limit torque Tlim1, and a second rated torque Tra2 is preset in the second winding group 43 as an individual rated torque smaller than the second limit torque Tlim2. The first rated torque Tra1 is equal to the second rated torque Tra2.

Next, the configuration of the steering controller 1 is described. As illustrated in FIG. 2, the steering controller 1 includes a first control unit 51 and a second control unit 61. The first control unit 51 controls energization of the first winding group 42. The second control unit 61 controls energization of the second winding group 43. The steering controller 1 independently controls the supply of the driving electric power to the first winding group 42 and the second winding group 43 for the respective energization systems. Each of the first control unit 51 and the second control unit 61 is a processor including a central processing unit (CPU) and a memory (not illustrated), and executes various types of control by the CPU executing a program stored in the memory in every predetermined calculation period.

Specifically, the first control unit 51 includes a first microcomputer 52 and a first drive circuit 53. The first microcomputer 52 serves as a control signal output unit configured to output a first control signal Sc1. The first drive circuit 53 supplies the driving electric power to the first winding group 42 based on the first control signal Sc1. First current sensors 54 are connected to the first microcomputer 52. The first current sensors 54 detect actual current values I1 of currents flowing through the first connection lines 44. For convenience of the description, FIG. 2 illustrates one collective first current sensor 54 for the respective phases.

The first drive circuit 53 is connected to an on-board power supply (battery) 56 via a first power supply line 55. The on-board power supply 56 is an external power supply mounted on the vehicle. The first power supply line 55 is provided with a power supply relay 57 to be turned ON or OFF in response to a signal from an activation switch of the vehicle (such as an ignition switch or a start switch). The first drive circuit 53 can supply the driving electric power to the first winding group 42 based on a power supply voltage of the on-board power supply 56 while the power supply relay 57 is turned ON and the first power supply line 55 is brought into conduction. Electric power of the on-board power supply 56 is supplied to the first microcomputer 52 via a power feed line (not illustrated).

A known pulse width modulation (PWM) inverter is employed as the first drive circuit 53. In the PWM inverter, pairs of switching elements (for example, field effect transistors) connected in series are defined as basic units (arms), and the arms are connected in parallel in association with the coils of the respective phases. The first control signal Sc1 is a gate ON/OFF signal for defining ON/OFF states of the switching elements. The first drive circuit 53 turns ON or OFF the switching elements in response to the first control signal Sc1 to convert direct current (DC) power supplied from the on-board power supply 56 into three-phase alternating current (AC) power, and supplies the three-phase AC power to the first winding group 42 via the first connection lines 44. Thus, the first control unit 51 controls a torque to be generated in the first winding group 42 through the supply of the driving electric power to the first winding group 42. If the motor 21 or the first drive circuit 53 is overheated, the first control unit 51 stops the supply of the driving electric power.

The second control unit 61 is basically constructed similarly to the first control unit 51, and includes a second microcomputer 62 and a second drive circuit 63. The second microcomputer 62 serves as a control signal output unit configured to output a second control signal Sc2. The second drive circuit 63 supplies the driving electric power to the second winding group 43 based on the second control signal Sc2. Second current sensors 64 are connected to the second microcomputer 62. The second current sensors 64 detect actual current values I2 of currents flowing through the second connection lines 45. For convenience of the description, FIG. 2 illustrates one collective second current sensor 64 for the respective phases.

The second drive circuit 63 of this embodiment is supplied with electric power from the same on-board power supply 56 as that in the case of the first drive circuit 53. Specifically, a second power supply line 65 connected to the second drive circuit 63 is connected to the first power supply line 55 at a connection point 66 between the power supply relay 57 and the first drive circuit 53. The second drive circuit 63 can supply the driving electric power to the second winding group 43 based on the power supply voltage of the on-board power supply 56 while the power supply relay 57 is turned ON and the first power supply line 55 and the second power supply line 65 are brought into conduction. The electric power of the on-board power supply 56 is supplied to the second microcomputer 62 via a power feed line (not illustrated).

A known PWM inverter is employed as the second drive circuit 63 similarly to the first drive circuit 53. The second control signal Sc2 is a gate ON/OFF signal for defining ON/OFF states of switching elements. The second drive circuit 63 turns ON or OFF the switching elements in response to the second control signal Sc2 to convert the DC power supplied from the on-board power supply 56 into three-phase AC power, and supplies the three-phase AC power to the second winding group 43 via the second connection lines 45. Thus, the second control unit 61 controls a torque to be generated in the second winding group 43 through the supply of the driving electric power to the second winding group 43. If the motor 21 or the second drive circuit 63 is overheated, the second control unit 61 stops the supply of the driving electric power.

Next, description is given of calculation of the first control signal Sc1 by the first microcomputer 52 and calculation of the second control signal Sc2 by the second microcomputer 62. The first microcomputer 52 and the second microcomputer 62 calculate the first control signal Sc1 and the second control signal Sc2, respectively, by executing arithmetic processing operations indicated by the following control blocks in every predetermined calculation period.

The vehicle speed SPD, the steering torque Th1, the driving assistance command value $\theta p1^*$, the rotation angle $\theta 1$, and the actual current values I1 are input to the first microcomputer 52. The first microcomputer 52 outputs the first control signal Sc1 based on those condition amounts. The vehicle speed SPD, the steering torque Th2, the driving assistance command value $\theta p2^*$, the rotation angle $\theta 2$, and the actual current values I2 are input to the second microcomputer 62. The second microcomputer 62 outputs the second control signal Sc2 based on those condition amounts.

Figure 4:
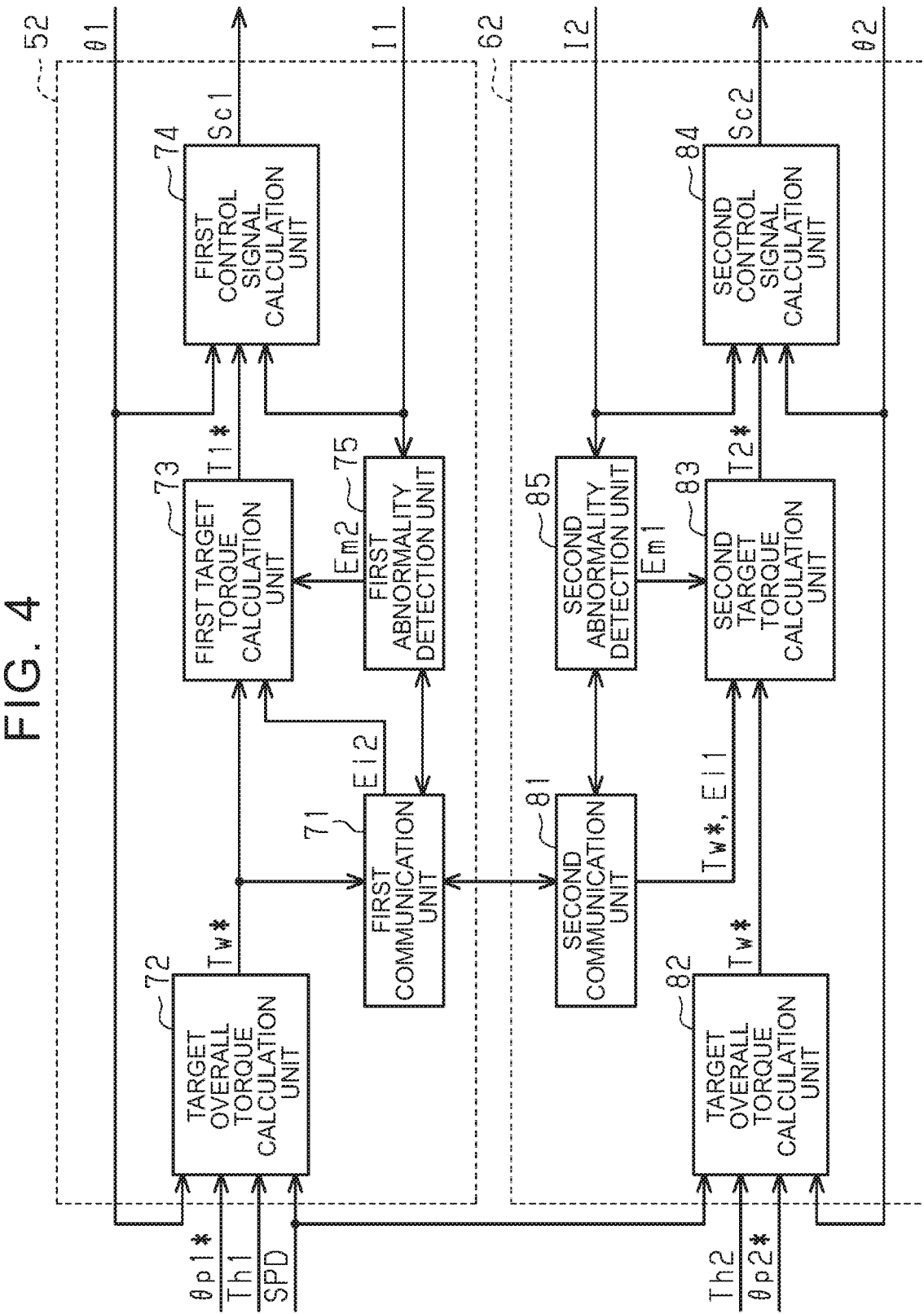
FIG. 4 is a block diagram of first and second microcomputers of the first embodiment.

Specifically, as illustrated in FIG. 4, the first microcomputer 52 includes a first communication unit 71 configured to communicate with the second microcomputer 62. The first microcomputer 52 further includes a target overall torque calculation unit 72, a first target torque calculation unit 73, and a first control signal calculation unit 74. The target overall torque calculation unit 72 calculates the target overall torque Tw* to be generated in the motor 21. The first target torque calculation unit 73 calculates a first target torque T1* to be generated in the first winding group 42 in the target overall torque Tw*. The first control signal calculation unit 74 calculates the first control signal Sc1. The first microcomputer 52 further includes a first abnormality detection unit 75 serving as a current abnormality detection unit and an operation abnormality detection unit.

The first communication unit 71 exchanges various signals between the calculation units of the first microcomputer 52 and a second communication unit 81 of the second microcomputer 62 described later. The first communication unit 71 outputs, to the first target torque calculation unit 73, a current abnormality detection signal Ei2 output from a second abnormality detection unit 85 described later.

The steering torque Th1, the vehicle speed SPD, the driving assistance command value θp1*, and the rotation angle θ1 are input to the target overall torque calculation unit 72. When the driving assistance command value θp1* is not input, the target overall torque calculation unit 72 calculates the target overall torque Tw* based on the steering torque Th1 and the vehicle speed SPD. When the driving assistance command value θp1* is input, the target overall torque calculation unit 72 calculates the target overall torque Tw* based on the driving assistance command value θp1* and the rotation angle θ1. The target overall torque Tw* may be calculated as a value indicating a torque or a value indicating a current. The first target torque T1* and a second target torque T2* described later may similarly be calculated as values indicating a torque or values indicating a current.

Specifically, when the driving assistance command value θp1* is not input, the target overall torque calculation unit 72 calculates a target overall torque Tw* having a larger absolute value within a range equal to or smaller than the overall rated torque Traw as the absolute value of the steering torque Th1 increases and as the vehicle speed SPD decreases. When the driving assistance command value θp1* is input, the target overall torque calculation unit 72 acquires the input rotation angle θ1 by, for example, counting the number of revolutions of the motor 21 from a neutral steering position and converting the rotation angle θ1 into an absolute angle within a range over 360°. Then, the target overall torque calculation unit 72 calculates the pinion angle θp by multiplying the rotation angle converted into the absolute angle by a conversion factor that is based on a speed reducing ratio of the transmission mechanism 22 and a lead of the conversion mechanism 23. Then, the target overall torque calculation unit 72 calculates the target overall torque Tw* within the range equal to or smaller than the overall rated torque Traw by executing angle feedback control (for example, proportional-integral-derivative (PID) control) based on the pinion angle θp and the driving assistance command value θp1* so that the pinion angle θp follows the driving assistance command value θp1*. The calculated target overall torque Tw* is output to the first target torque calculation unit 73 and the first communication unit 71.

The target overall torque Tw*, the current abnormality detection signal Ei2, and an operation abnormality detection signal Em2 described later are input to the first target torque calculation unit 73. As described later, the first target torque calculation unit 73 calculates the first target torque T1* based on those condition amounts. The first target torque T1* is a torque to be generated in the first winding group 42 so as to generate the target overall torque Tw* in the motor 21.

The first target torque T1*, the actual current values I1, and the rotation angle θ1 are input to the first control signal calculation unit 74. The first control signal calculation unit 74 calculates a first current command value based on the first target torque T1*. In consideration of the fact that the absolute value of the torque to be generated in the first winding group 42 increases based on an increase in the absolute value of the current to be supplied to the first winding group 42, the first control signal calculation unit 74 calculates a first current command value having a larger absolute value as the absolute value of the first target torque T1* increases. Then, the first control signal calculation unit 74 calculates a voltage command value of a voltage to be applied to the first drive circuit 53 by executing current feedback control (for example, PID control) based on the actual current values I1 and the first current command value so that the actual current values I1 follow the first current command value. The first control signal calculation unit 74 calculates a first control signal (PWM signal) Sc1 having a duty ratio that is based on the voltage command value. By outputting the calculated first control signal Sc1 to the first drive circuit 53, the driving electric power is supplied to the first winding group 42 in response to the first control signal Sc1. Thus, the torque indicated by the first target torque T1* is generated in the first winding group 42.

The actual current values I1 are input to the first abnormality detection unit 75, and various signals are input to the first abnormality detection unit 75 via the first communication unit 71. The first abnormality detection unit 75 determines whether a current abnormality such as a wire disconnection or a short circuit occurs in the energization system for the first winding group 42 based on the target overall torque Tw* and the actual current values I1. For example, the first abnormality detection unit 75 determines that the current abnormality of the wire disconnection occurs when the target overall torque Tw* is larger than zero but the actual current values I1 remain zero for a predetermined time or longer. The first abnormality detection unit 75 determines that the current abnormality of the short circuit occurs when the target overall torque Tw* is zero but the actual current values I1 remain larger than zero for a predetermined time or longer. When the current abnormality is detected, the first abnormality detection unit 75 outputs, to the first communication unit 71, a current abnormality detection signal Ei1 indicating that the current abnormality is detected.

The first abnormality detection unit 75 detects an operation abnormality of the second microcomputer 62 based on a status of communication with the second microcomputer 62 via the first communication unit 71. For example, the first abnormality detection unit 75 determines that the operation abnormality occurs in the second microcomputer 62 when various signals are not input from the second microcomputer 62 via the first communication unit 71. The first abnormality detection unit 75 determines that the operation abnormality does not occur in the second microcomputer 62 when various signals are input from the second microcomputer 62. When the operation abnormality of the second microcomputer 62 is detected, the first abnormality detection unit 75 outputs, to the first target torque calculation unit 73, the operation abnormality detection signal Em2 indicating that the operation abnormality of the second microcomputer 62 is detected.

The second microcomputer 62 is basically constructed similarly to the first microcomputer 52, and includes the second communication unit 81 configured to exchange various signals with the first communication unit 71. The second microcomputer 62 further includes a backup target overall torque calculation unit 82, a second target torque calculation unit 83, and a second control signal calculation unit 84. The second target torque calculation unit 83 calculates the second target torque T2* to be generated in the second winding group 43 in the target overall torque Tw*. The second control signal calculation unit 84 calculates the second control signal Sc2. The second microcomputer 62 further includes the second abnormality detection unit 85 serving as the current abnormality detection unit and the operation abnormality detection unit.

The second communication unit 81 exchanges various signals between the calculation units of the second microcomputer 62 and the first communication unit 71. The second communication unit 81 outputs, to the second target torque calculation unit 83, the target overall torque Tw* and the current abnormality detection signal Ei1 input via the first communication unit 71.

The steering torque Th2, the vehicle speed SPD, the driving assistance command value θp2*, and the rotation angle θ2 are input to the target overall torque calculation unit 82. The target overall torque calculation unit 82 calculates a backup target overall torque Tw* through arithmetic processing similar to that of the target overall torque calculation unit 72 of the first microcomputer 52.

The target overall torque Tw* and the current abnormality detection signal Ei1 are input to the second target torque calculation unit 83 via the second communication unit 81, and the backup target overall torque Tw* is input to the second target torque calculation unit 83. Further, an operation abnormality detection signal Em1 described later is input to the second target torque calculation unit 83. As described later, the second target torque calculation unit 83 calculates the second target torque T2* based on those condition amounts. The second target torque T2* is a torque to be generated in the second winding group 43 so as to generate the target overall torque Tw* in the motor 21.

The second target torque T2*, the actual current values I2, and the rotation angle θ2 are input to the second control signal calculation unit 84. The second control signal calculation unit 84 calculates the second control signal (PWM signal) Sc2 through arithmetic processing similar to that of the first control signal calculation unit 74. By outputting the calculated second control signal Sc2 to the second drive circuit 63, the driving electric power is supplied to the second winding group 43 in response to the second control signal Sc2. Thus, the torque indicated by the second target torque T2* is generated in the second winding group 43.

The second abnormality detection unit 85 is connected to the second communication unit 81. The actual current values I2 are input to the second abnormality detection unit 85, and various signals are input to the second abnormality detection unit 85 via the second communication unit 81. The second abnormality detection unit 85 determines whether a current abnormality such as a wire disconnection or a short circuit occurs in the energization system for the second winding group 43 based on the target overall torque Tw* and the actual current values I2 through arithmetic processing similar to that of the first abnormality detection unit 75. When the current abnormality is detected, the second abnormality detection unit 85 outputs, to the second communication unit 81, the current abnormality detection signal Ei2 indicating that the current abnormality is detected. The second abnormality detection unit 85 detects an operation abnormality of the first microcomputer 52 based on a status of communication with the first microcomputer 52 via the second communication unit 81 through arithmetic processing similar to that of the first abnormality detection unit 75. When the operation abnormality of the first microcomputer 52 is detected, the second abnormality detection unit 85 outputs, to the second target torque calculation unit 83, the operation abnormality detection signal Em1 indicating that the operation abnormality of the first microcomputer 52 is detected.

Next, description is given of calculation of the first target torque T1* and calculation of the second target torque T2*.

In the event of an abnormality, the current abnormality detection signal Ei2 and the operation abnormality detection signal Em2 are input to the first target torque calculation unit 73, in addition to the target overall torque Tw*. The first target torque calculation unit 73 calculates the first target torque T1* based on those condition amounts.

Specifically, in a normal state in which the current abnormality detection signal Ei2 or the operation abnormality detection signal Em2 is not input, the first target torque calculation unit 73 sets a value that is a half (50%) of the target overall torque Tw* as the first target torque T1*. When the current abnormality detection signal Ei2 or the operation abnormality detection signal Em2 is input and the target overall torque Tw* is equal to or smaller than the first rated torque Tra1, the first target torque calculation unit 73 calculates a first target torque T1* larger than that in the normal state so that the first target torque T1* is equal to the target overall torque Tw*. When the current abnormality detection signal Ei2 or the operation abnormality detection signal Em2 is input and the target overall torque Tw* is larger than the first rated torque Tra1, the first target torque calculation unit 73 calculates a first target torque T1* larger than that in the normal state so that the first target torque T1* is equal to or close to the target overall torque Tw* over the first rated torque Tra1. That is, when the second winding group 43 cannot generate the torque, the first control unit 51 causes the first winding group 42 to generate a torque larger than that in the normal state, and to temporarily generate a torque larger than the first rated torque Tra1 depending on the magnitude of the target overall torque Tw*.

The current abnormality detection signal Ei1 and the operation abnormality detection signal Em1 are input to the second target torque calculation unit 83, in addition to the target overall torque Tw*. The second target torque calculation unit 83 calculates the second target torque T2* based on those condition amounts. When the operation abnormality occurs in the first microcomputer 52, the second target torque calculation unit 83 calculates the second target torque T2* based on the backup target overall torque Tw*. In a normal state in which the current abnormality detection signal Ei1 or the operation abnormality detection signal Em1 is not input, the second target torque calculation unit 83 sets a value that is a half (50%) of the target overall torque Tw* as the second target torque T2*. When the current abnormality detection signal Ei1 or the operation abnormality detection signal Em1 is input and the target overall torque Tw* is equal to or smaller than the second rated torque Tra2, the second target torque calculation unit 83 calculates a second target torque T2* larger than that in the normal state so that the second target torque T2* is equal to the target overall torque Tw*. When the current abnormality detection signal Ei1 or the operation abnormality detection signal Em1 is input and the target overall torque Tw* is larger than the second rated torque Tra2, the second target torque calculation unit 83 calculates a second target torque T2* larger than that in the normal state so that the second target torque T2* is equal to or close to the target overall torque Tw* over the second rated torque Tra2. That is, when the first winding group 42 cannot generate the torque, the second control unit 61 causes the second winding group 43 to generate a torque larger than that in the normal state, and to temporarily generate a torque larger than the second rated torque Tra2 depending on the magnitude of the target overall torque Tw*.

Next, description is given of an operation of the motor 21 in the event of an abnormality. For example, the target overall torque Tw* is assumed to be 60% of the overall rated torque Traw as illustrated in FIG. 3A to FIG. 3C. When no abnormality occurs, the first winding group 42 outputs a torque that is 60% of the first rated torque Tra1 (30% of the overall rated torque Traw), and the second winding group 43 outputs a torque that is 60% of the second rated torque Tra2 (30% of the overall rated torque Traw).

For example, when the second winding group 43 cannot output the torque due to the occurrence of a current abnormality, the first winding group 42 temporarily outputs a torque that is 120% of the first rated torque Tra1. Therefore, the entire motor 21 outputs a torque that is 60% of the overall rated torque Traw. Thus, deficiency of the torque to be applied from the motor 21 is temporarily suppressed even in the event of the abnormality.

Next, actions and effects of this embodiment are described.

(1) For example, if the motor 21, the first drive circuit 53, or the second drive circuit 63 being overheated is allowed in a short time, the first winding group 42 or the second winding group 43 can generate a torque larger than the first rated torque Tra1 or the second rated torque Tra2 from the viewpoint of the structure of the motor 21. In the steering controller 1, when the target overall torque Tw* is larger than an individual rated torque (first rated torque Tra1 or second rated torque Tra2) of an energization system in which an abnormality does not occur, a winding group (first winding group 42 or second winding group 43) in which the abnormality does not occur generates a torque larger than the individual rated torque. Therefore, deficiency of the torque to be applied from the motor 21 can temporarily be suppressed for the short time until the motor 21, the first drive circuit 53, or the second drive circuit 63 is overheated. Thus, the deficiency of the torque to be applied from the motor 21 is temporarily suppressed even if an abnormality occurs, for example, while the vehicle is making a turn. Accordingly, it is possible to reduce, for example, the occurrence of a case where the traveling direction of the vehicle deviates from a target direction.

(2) The steering controller 1 includes the first abnormality detection unit 75 configured to detect a current abnormality of the energization system for the first winding group 42, and the second abnormality detection unit 85 configured to detect a current abnormality of the energization system for the second winding group 43. When the current abnormality is detected and the target overall torque Tw* is larger than an individual rated torque of an energization system in which the current abnormality does not occur, the steering controller 1 supplies the driving electric power so that a winding group of the energization system in which the current abnormality does not occur generates a torque larger than the individual rated torque. Therefore, the deficiency of the torque to be applied from the motor 21 can temporarily be suppressed in the event of the current abnormality in which the first winding group 42 or the second winding group 43 cannot generate the torque due to, for example, a wire disconnection or a short circuit in the energization system.

(3) The steering controller 1 includes the first abnormality detection unit 75 configured to detect an operation abnormality of the second microcomputer 62, and the second abnormality detection unit 85 configured to detect an operation abnormality of the first microcomputer 52. When the operation abnormality is detected and the target overall torque Tw* is larger than an individual rated torque of an energization system in which the operation abnormality does not occur, the steering controller 1 supplies the driving electric power so that a winding group of the energization system in which the operation abnormality does not occur generates a torque larger than the individual rated torque. Therefore, the deficiency of the torque to be applied from the motor 21 can temporarily be suppressed in the event of the operation abnormality in which the first winding group 42 or the second winding group 43 cannot generate the torque due to, for example, a halt of the first microcomputer 52 or the second microcomputer 62.

Second Embodiment

Next, a second embodiment in which the motor controller is applied to the steering controller is described with reference to the drawings. For convenience of the description, the same components are represented by the same reference symbols as those in the first embodiment to omit their description.

Figure 5:
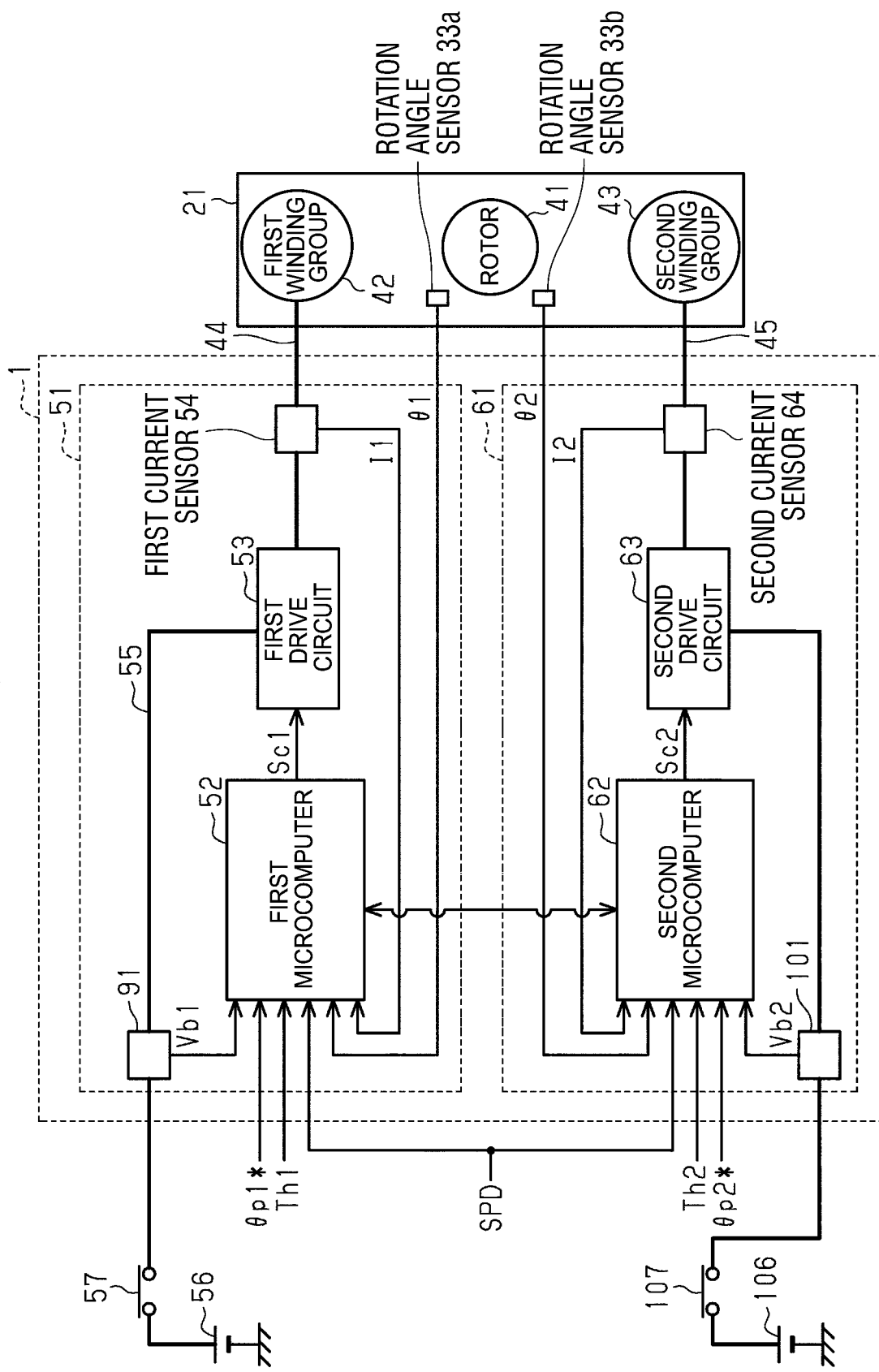
FIG. 5 is a block diagram of a steering controller of a second embodiment.

As illustrated in FIG. 5, the first power supply line 55 is provided with a first voltage sensor 91 configured to detect a power supply voltage Vb1 of the on-board power supply 56. The power supply voltage Vb1 is input to the first microcomputer 52 in addition to the vehicle speed SPD, the steering torque Th1, the driving assistance command value θp1*, the rotation angle θ1, and the actual current values I1.

The second drive circuit 63 of this embodiment is supplied with electric power from an on-board power supply 106 that is an external power supply different from that for the first drive circuit 53. Specifically, the second drive circuit 63 is connected, via the second power supply line 65, to the on-board power supply 106 mounted on the vehicle, but is not connected to the on-board power supply 56. The second power supply line 65 is provided with a power supply relay 107 and a second voltage sensor 101. The power supply relay 107 is turned ON or OFF in response to a signal from the activation switch of the vehicle. The second voltage sensor 101 detects a power supply voltage Vb2 of the on-board power supply 106. The second drive circuit 63 can supply the driving electric power to the second winding group 43 based on the power supply voltage of the on-board power supply 106 while the power supply relay 107 is turned ON and the second power supply line 65 is brought into conduction. The electric power of the on-board power supply 106 is supplied to the second microcomputer 62 via a power feed line (not illustrated). The power supply voltage Vb2 is input to the second microcomputer 62 in addition to the vehicle speed SPD, the steering torque Th2, the driving assistance command value θp2*, the rotation angle θ2, and the actual current values I2.

Figure 6:
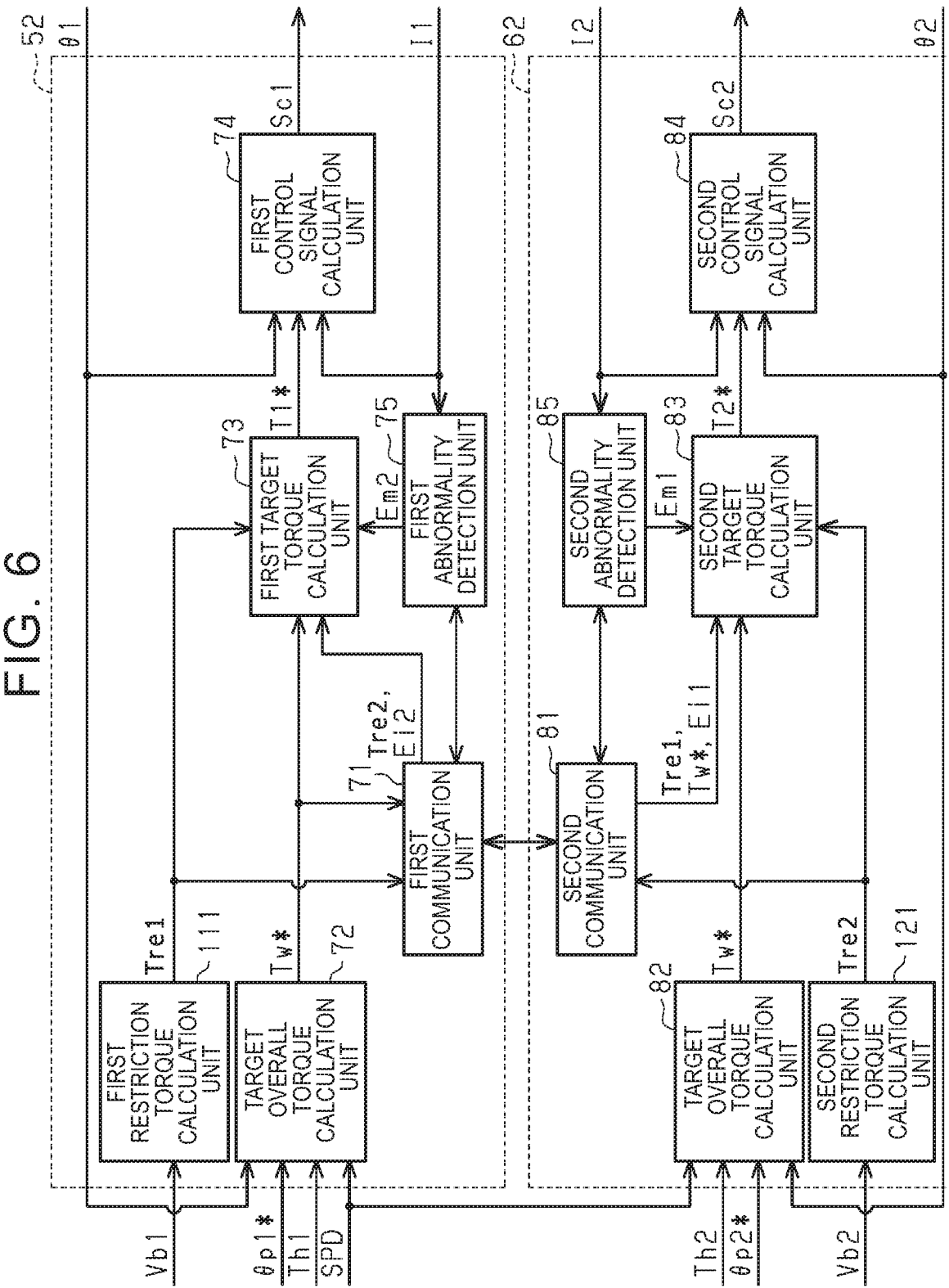
FIG. 6 is a block diagram of first and second microcomputers of the second embodiment.

As illustrated in FIG. 6, the first microcomputer 52 of this embodiment includes a first restriction torque calculation unit 111 configured to calculate a first restriction torque Tre1 for restricting the first target torque T1* to the first rated torque Tra1 or smaller. The power supply voltage Vb1 is input to the first restriction torque calculation unit 111. The first restriction torque calculation unit 111 calculates the first restriction torque Tre1 based on the power supply voltage Vb1 of the on-board power supply 56 from the viewpoint of suppressing a decrease in the power supply voltage Vb1. Specifically, when the absolute value of the power supply voltage Vb1 is equal to or smaller than a voltage threshold, the first restriction torque calculation unit 111 calculates a first restriction torque Tre1 having a smaller absolute value based on a decrease in the absolute value of the power supply voltage Vb1. When the absolute value of the power supply voltage Vb1 is larger than the voltage threshold, the first restriction torque calculation unit 111 calculates a first restriction torque Tre1 equal to the first rated torque Tra1.

The voltage threshold is preset based on a lower limit value of an assist assurance voltage range of the steering apparatus 2. The calculated first restriction torque Tre1 is output to the first target torque calculation unit 73 and the first communication unit 71.

Similarly to the first microcomputer 52, the second microcomputer 62 of this embodiment includes a second restriction torque calculation unit 121 configured to calculate a second restriction torque Tre2 for restricting the second target torque T2* to the second rated torque Tra2 or smaller. The power supply voltage Vb2 is input to the second restriction torque calculation unit 121. The second restriction torque calculation unit 121 calculates the second restriction torque Tre2 based on the power supply voltage Vb2 through arithmetic processing similar to that of the first restriction torque calculation unit 111. The calculated second restriction torque Tre2 is output to the second target torque calculation unit 83 and the second communication unit 81.

Next, description is given of calculation of the first target torque T1* in a restricted state in which the current abnormality detection signal Ei2 or the operation abnormality detection signal Em2 is not input to the first target torque calculation unit 73, the first restriction torque Tre1 is equal to the first rated torque Tra1, and the second restriction torque Tre2 is smaller than the second rated torque Tra2. In this restricted state, when the target overall torque Tw* is equal to or smaller than the total of the second restriction torque Tre2 and the first rated torque Tra1, the first target torque calculation unit 73 calculates a first target torque T1* larger than that in the normal state so that the first target torque T1* is equal to the target overall torque Tw*. When the target overall torque Tw* is larger than the total of the second restriction torque Tre2 and the first rated torque Tra1, the first target torque calculation unit 73 calculates a first target torque T1* larger than that in the normal state so that the first target torque T1* is equal to or close to the target overall torque Tw* over the first rated torque Tra1. When the current abnormality detection signal Ei2 or the operation abnormality detection signal Em2 is input, the first target torque calculation unit 73 calculates the first target torque T1* similarly to the first embodiment.

Next, description is given of calculation of the second target torque T2* in a restricted state in which the current abnormality detection signal Ei1 or the operation abnormality detection signal Em1 is not input to the second target torque calculation unit 83, the second restriction torque Tre2 is equal to the second rated torque Tra2, and the first restriction torque Tre1 is smaller than the first rated torque Tra1. In this restricted state, when the target overall torque Tw* is equal to or smaller than the total of the first restriction torque Tre1 and the second rated torque Tra2, the second target torque calculation unit 83 calculates a second target torque T2* larger than that in the normal state so that the second target torque T2* is equal to the target overall torque Tw*. When the target overall torque Tw* is larger than the total of the first restriction torque Tre1 and the second rated torque Tra2, the second target torque calculation unit 83 calculates a second target torque T2* larger than that in the normal state so that the second target torque T2* is equal to or close to the target overall torque Tw* over the second rated torque Tra2. When the current abnormality detection signal Ei1 or the operation abnormality detection signal Em1 is input, the second target torque calculation unit 83 calculates the second target torque T2* similarly to the first embodiment.

This embodiment produces actions and effects similar to the actions and effects (1) to (3) of the first embodiment.

(4) The on-board power supply 56 is connected to the first control unit 51, and the on-board power supply 106 is connected to the second control unit 61. The steering controller 1 includes the first restriction torque calculation unit 111 configured to calculate the first restriction torque Tre1 based on the power supply voltage Vb1, and the second restriction torque calculation unit 121 configured to calculate the second restriction torque Tre2 based on the power supply voltage Vb2. When the target overall torque Tw* is larger than the total of the first restriction torque Tre1 or the second restriction torque Tre2 and the second rated torque Tra2 or the first rated torque Tra1, the steering controller 1 supplies the driving electric power so that the first winding group 42 or the second winding group 43 that is not in the restricted state generates a torque larger than the first rated torque Tra1 or the second rated torque Tra2. Therefore, the deficiency of the torque to be applied from the motor 21 can temporarily be suppressed in the restricted state in which the power supply voltage Vb1 or Vb2 decreases and the first winding group 42 or the second winding group 43 can only generate a torque smaller than the first rated torque Tra1 or the second rated torque Tra2.

The embodiments described above may be modified as follows. The embodiments described above and modified examples described below may be combined without causing any technical contradiction.

In the second embodiment, the first control unit 51 may not include the first abnormality detection unit 75, and the second control unit 61 may not include the second abnormality detection unit 85.

In the embodiments described above, the first abnormality detection unit 75 may detect a wire disconnection or a short circuit alone. Similarly, the second abnormality detection unit 85 may detect a wire disconnection or a short circuit alone.

In the embodiments described above, the current abnormality is detected based on the target overall torque Tw* and the actual current values I1, but the applicable embodiment is not limited to this case. For example, the current abnormality may be detected based on a current command value and the actual current values I1. The detection method may be changed as appropriate. Similarly, the detection method for the operation abnormality may be changed as appropriate.

In the embodiments described above, the driving assistance command values θp1* and θp2* may not be input from the driving assistance controller 35 to the steering controller 1.

In the embodiments described above, control is made over the motor 21 including the first winding group 42 and the second winding group 43 having the same specifications of the coils, but the applicable embodiment is not limited to this case. Control may be made over a motor in which specifications and individual rated torques differ from each other between winding groups of energization systems.

In the embodiments described above, the steering apparatus 2 is constructed as the EPS, and control is made over the motor 21 configured to apply the assist torque. The applicable embodiment is not limited to this case. For example, the steering apparatus 2 may be constructed as a steer-by-wire type apparatus in which power transmission between a steering portion and a steered portion is separated, and control may be made over a motor configured to apply a steering operation torque for turning steered wheels. Further, control may be made over a motor provided at a portion other than the steering apparatus.

The steering controller 1 of each of the embodiments described above controls the motor 21 including the first winding group 42 and the second winding group 43 having two separate energization systems. The applicable embodiment is not limited to this case. The steering controller 1 may control a motor including winding groups having three or more separate systems.

What is claimed is:

1. A motor controller configured to control a motor including a plurality of winding groups, the motor being provided with a plurality of energization systems, each of the winding groups being included in a corresponding one of the energization systems, the motor controller comprising a plurality of processors, each of the processors configured to independently control supply of driving electric power to each of the winding groups in the corresponding one of the energization systems, each of the processors being configured to calculate respective control signals based on target individual torques which is split for each of the winding groups in the corresponding one of the energization systems from a target overall torque to be generated in the motor, each of the processors including drive circuits configured to supply the driving electric power to each of the winding groups in the corresponding one of the energization systems based on the control signals, each of the processors being configured to calculate the target individual torques such that each of the target individual torques is equal to or smaller than an individual rated torque set to be smaller than an individual limit torque determined depending on a structure of the motor as a limit of a torque to be output in each of the winding groups in the corresponding one of the energization systems, each of the processors being configured such that, when an abnormality occurs in which a torque to be generated in one of the winding groups in the corresponding one of the energization systems is smaller than the individual rated torque and when the target overall torque is larger than a total of the individual rated torque for the winding group in the corresponding one of the energization systems in which the abnormality does not occur, the processor, controlling supply of driving electric power to the winding group in the corresponding one of the energization systems in which the abnormality does not occur, out of the plurality of processors controls supply of the driving electric power such that the winding group generates a torque larger than the individual rated torque.

2. The motor controller according to claim 1, wherein:

each of the processors is configured to detect a current abnormality including at least one of a wire disconnection and a short circuit in the energization system; and the processors are configured such that, when the current abnormality is detected and the target overall torque is larger than the total of the individual rated torque for the winding group in the corresponding one of the energization systems in which the current abnormality does not occur, the processor, controlling supply of driving electric power to the winding group in the corresponding one of the energization systems in which the current abnormality does not occur, out of the plurality of processors controls supply of the driving electric power such that the winding group generates a torque larger than the individual rated torque.

3. The motor controller according to claim 1, wherein:

each of the processors is configured to detect an operation abnormality of the processor configured to controls supply of driving electric power to the winding group in the corresponding one of the other energization system; and the processors are configured such that, when the operation abnormality is detected and when the target overall torque is larger than the total of the individual rated torque for the winding group in the corresponding one of the energization systems in which the operation abnormality does not occur, the processor, controlling supply of driving electric power to the winding group in the corresponding one of the energization systems in which the operation abnormality does not occur, out of the plurality of processors controls supply of the driving electric power such that the winding group generates a torque larger than the individual rated torque.

4. The motor controller according to claim 1, wherein:

each of the processors are connected to individual external power supplies;

the processors are configured to calculate individual restriction torques for restricting the target individual torques to the individual rated torques or smaller based on power supply voltages of the external power supplies; and the processors are configured such that, when one of the winding groups in the corresponding one of the energization systems is in a restricted state in which the individual restriction torque is smaller than the individual rated torque and when the target overall torque is larger than a total of the individual rated torque of the winding group in the corresponding one of the energization systems that is not in the restricted state and the individual restriction torque of the winding group in the corresponding one of the energization system that is in the restricted state, the processor, controlling supply of driving electric power to the winding group in the corresponding one of the energization systems that is not in the restricted state, out of the plurality of processors controls supply of the driving electric power such that the winding group generates a torque larger than the individual rated torque.

5. The motor controller according to claim 1, wherein the motor is configured to generate a torque to be applied to a steering mechanism.

* * * * *